Figure 1:
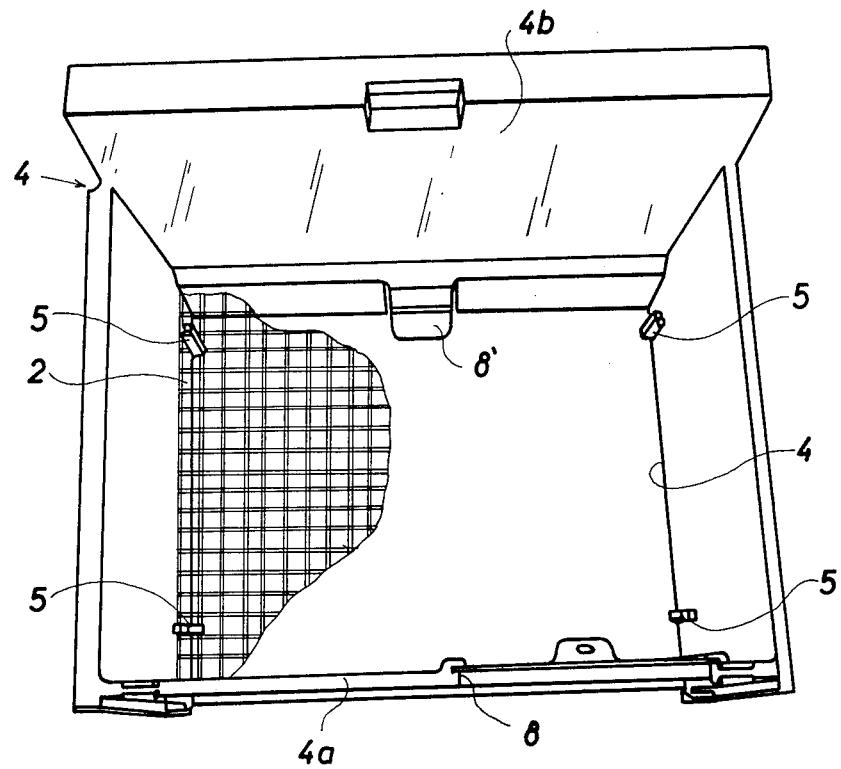

United States Patent [19]

Hansen et al.

[11] 4,287,854
[45] Sep. 8, 1981

[54] CAGE CONSTRUCTION FOR USE IN BREEDING FUR-BEARING ANIMALS

[75] Inventors: Finn Hansen, Risskov, Denmark; Bernhard Lodder, Hardenberg, Netherlands

[73] Assignee: Wavin B.V., Em Zwolle, Netherlands

[21] Appl. No.: 120,543

[22] Filed: Feb. 11, 1980

[30] Foreign Application Priority Data

Feb. 12, 1979 [DK] Denmark ............................. 573/79

[51] Int. Cl.³ .......................... A01K 1/02; A01K 1/03
[52] U.S. Cl. .................................................. 119/17
[58] Field of Search ..................... 119/17, 18, 19, 15

[56] References Cited

U.S. PATENT DOCUMENTS

| | | | |
|---|---|---|---|
| 2,655,129 | 10/1953 | Miller | 119/17 |
| 3,381,663 | 5/1968 | Dayton | 119/17 X |
| 3,990,398 | 11/1976 | Davis | 119/17 |

Primary Examiner—Hugh R. Chamblee
Attorney, Agent, or Firm—Wilkinson, Mawhinney & Theibault

[57] ABSTRACT

A cage construction for use in breeding fur-bearing animals such as mink, comprises a plurality of cages arranged on a stand, whereby each cage is provided with a breeding coop with an opening giving access to the cage. Each breeding coop is formed by a vertical plastic pipe open at both ends and having a substantially rectangular cross section, the pipe wall being formed by a central foam plastic layer and an outer and an inner solid surface layer. These layers are integrally connected.

12 Claims, 12 Drawing Figures

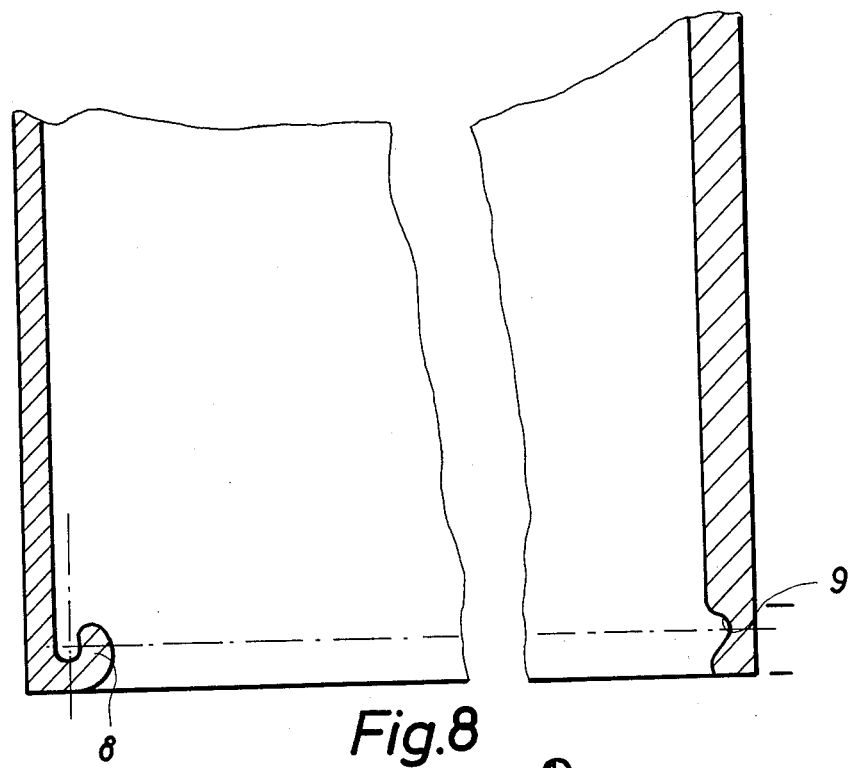
Fig.8
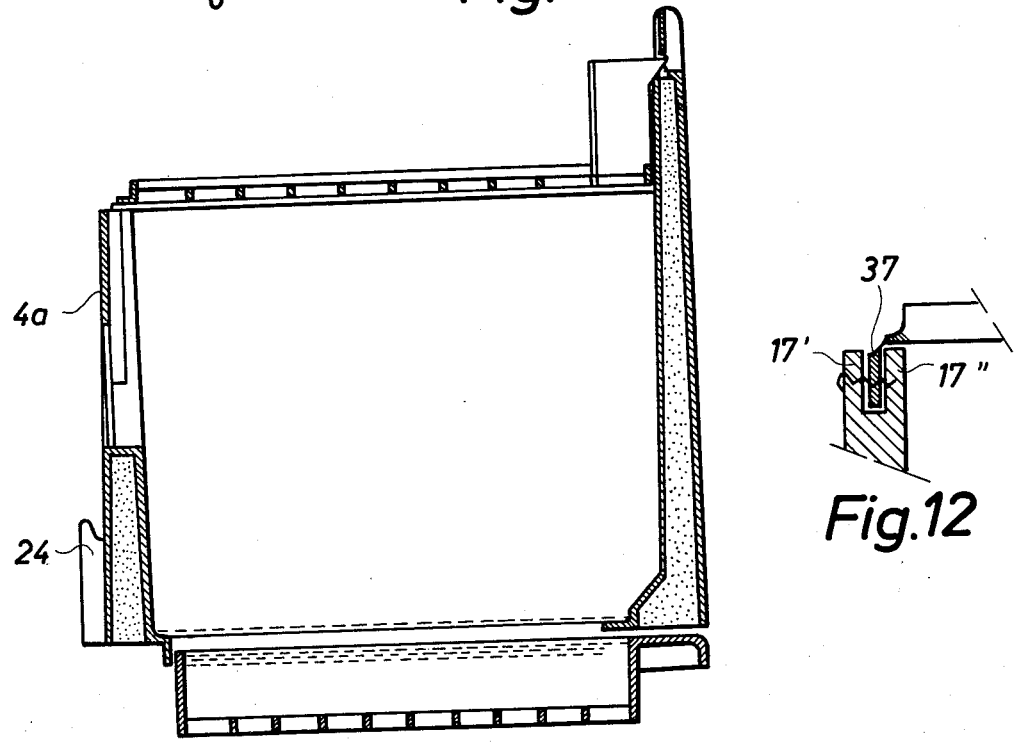
Fig.11
Fig.12

CAGE CONSTRUCTION FOR USE IN BREEDING FUR-BEARING ANIMALS

The invention relates to a cage construction for use in breeding fur-bearing animals, such as mink, and comprising a plurality of cages arranged on a stand, whereby each cage is provided with a breeding coop with an opening giving access to the cage.

For breeding mink, cage constructions have previously been used, whereby the individual cages comprise an externally arranged breeding coop, in which the minks may sleep and optionally hide their pups. Each breeding coop is usually semidetached with the adjacent breeding coop of the adjacent cage. The breeding coops are usually made of wood and may contain a coop insert. Since the wood, however, discloses many cracks, many impurities such as for instance bacteria, fungus spores and the like may collect therein and thus injure the health of the animals. Therefore it has also been suggested to manufacture the breeding coops of plastics. A known breeding coop thus comprises an inner plastic pipe having a solid wall, and a loosely situated outer plastic pipe of foam plastic. The inner pipe is closed at the lower end by means of a permanently secured bottom wall. It is noted that the outer plastic pipe comprises a bottom covering the bottom of the inner plastic pipe. At the top the inner plastic pipe comprises a cover provided with a grate. When cleaning, for instance steam cleaning, such a breeding coop it is necessary to remove it from the cage, and subsequently to take it to pieces. The outermost cells of the foam plastic hereby being uncovered have, however, a tendency to attract impurities such as bacteria, fungus spores and the like, which is very unfortunate to the health of the animals and which furthermore increases the cleaning operation.

The object of the present invention is to provide a cage construction of the above type, the breeding coops of which are very easy to clean both on the outside and on the inside, and which do not require a removal for said cleaning, and whereby the walls of the breeding coops furthermore are of such a nature that they to a high degree repel impurities without decreasing the insulating capability of the coops.

The cage construction according to the invention is characterized in that each breeding coop comprises a vertical plastic pipe open at both ends and having a substantially rectangular cross section, whereby the pipe wall is formed by a central foam plastic layer and an outer and an inner solid surface layer, said layers being integrally connected. As a result, the insulating foam plastic layer implies no collection of impurities, since it is always isolated from said impurities. The solid surface layers besides repel dirt and impurities. When using a breeding coop, a layer of straw is as usual provided both at the uppermost end of the coop and at the lowermost end of the coop, besides cf. below, whereby the animals may have material for a comfortable habitat. When cleaning the breeding coop, the major part of the straw is manually removed, whereafter the pipe may be immediately sprayed with steam both on the outer side and on the inner side, which may be performed without removing the breeding coop.

According to the invention, molded projections projecting into the pipe may be provided on the inner side of the pipe wall at a predetermined distance from the lower edge of the pipe wall, said projections optionally being present in the form of corner ledges for supporting an inner coop insert or an intermediate bottom in the form of a grate, preferably a metal grate. In this manner the cleaning is additionally facilitated, since the projections only involve an insignificant collection of impurities. This is due to the fact that the surfaces of said projections are formed integral with the pipe wall, i.e. not produced by means of separate pins extending through the wall.

Moreover according to the invention, one or more auxiliary projections may be provided at the lower edge of the pipe wall, said projections being adapted to pivotably mount and/or lock a perforated bottom wall such as for instance a second metal grate closing the plastic pipe. As a result an easy removal of the faeces of the animals is obtained, as well as the above mentioned lowermost layer of straw is efficiently retained between said intermediate bottom and said perforated bottom wall.

According to the invention a part of the pipe wall forming the rear wall of the breeding coop may extend a short distance above the remaining portion of the pipe and be provided with molded means such as a recess, an aperture, or a projection opposing the interior of the pipe, for locking the coop insert in the pipe. As a result, the coop insert is efficiently secured to the breeding coop, also though the animal might be very jumpy. The coop insert may optionally comprise an upward projection engaging said recess.

In case the breeding coop instead of the coop insert comprises an intermediate bottom in the form of a metal grate, the upper end of the pipe wall may according to the invention comprise hinge-forming projections such as for instance projections with an intergap adapted for pivotably mounting a third grate defining the upper end of the pipe. In this case the breeding coop is very simple, which simplifies the cleaning. The animals can never jump up and out of the pipe since said pipe is closed at the top.

A very efficient connection of each breeding coop to each cage is according to the invention provided by the cage stand being formed by two substantially hairpin-shaped main carrying rails for securing on one or more vertical supporting posts, as well as by at least two longitudinal auxiliary rails supporting the breeding coops, said auxiliary rails extending from one main carrying rail to the other. In this manner the hairpin-shaped main carrying rails support the cages, whereas the auxiliary rails support the breeding coops. Moreover according to the invention, the pipe wall may at its lower edge comprise one or more recesses co-operating with one or more of the longitudinal auxiliary rails in the coop stand in such a manner that the breeding coops may optionally be displaced along the auxiliary rails, whereby a very reliable arrangement of the breeding coops is provided. However, if it is desired to remove these breeding coops this may be done very easily.

In order to prevent weakening of the pipe wall on account of the recess, the recess may be made in a bead on the pipe wall.

Furthermore according to the invention, the pipe wall may on the side opposing the cage comprise molded hook-like protuberances supporting the cages. This embodiment is very advantageous where the cages are built together so as to form a sort of a beam primarily supported by the main carrying rails arranged at the ends of the cage construction, since said hook-like protuberances prevent the beam from bending too much outwards. Thus these protuberances provide an additional support of the beam.

A particularly preferred embodiment of the breeding coop according to the invention is characterized in that the plastic pipe is made of structural foam, and that the central layer of the pipe comprises a propellant foaming said layer.

Moreover according to the invention, the plastic pipe may be made of high density polyethylene having great impact strength at low temperatures and withstanding steam cleaning.

According to the invention it is especially preferred too that the plastic pipe is made of polypropylene.

According to the invention, the plastic pipe may besides be manufactured by injection moulding using a foam agent, whereby the pipe comprises a foam layer capsuled between two solid skin-like surface layers. The surface layers must not, of course, be so thin that the animals can gnaw a hole therein.

In order to avoid draught within the breeding coop, the opening of the breeding coop to the cage may according to the invention be adapted to be closed by means of a sliding or a swing door.

Moreover according to the invention, the inner corners of the pipe may be slightly rounded, thereby additionally reducing the risk of impurities sticking thereto.

According to the invention, the bottom wall may instead of being pivotable be adapted for rectilinear movement as a drawer, whereby the faeces of the animals may easily be removed.

The invention furthermore deals with a breeding coop as defined above for use in connection with a cage on a stand.

Figure 2:
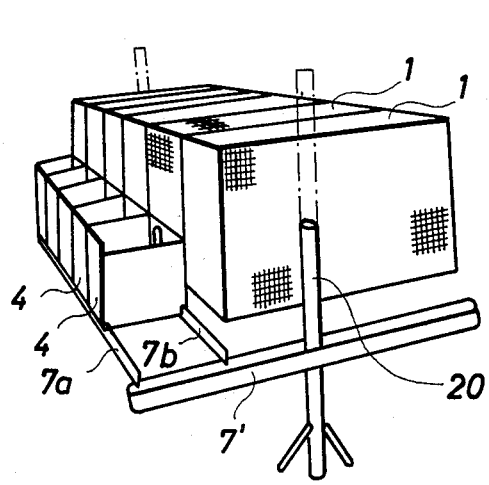
Figure 3:
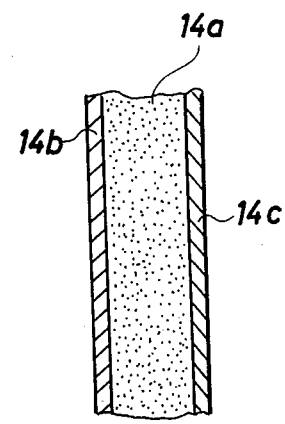
Figure 4:
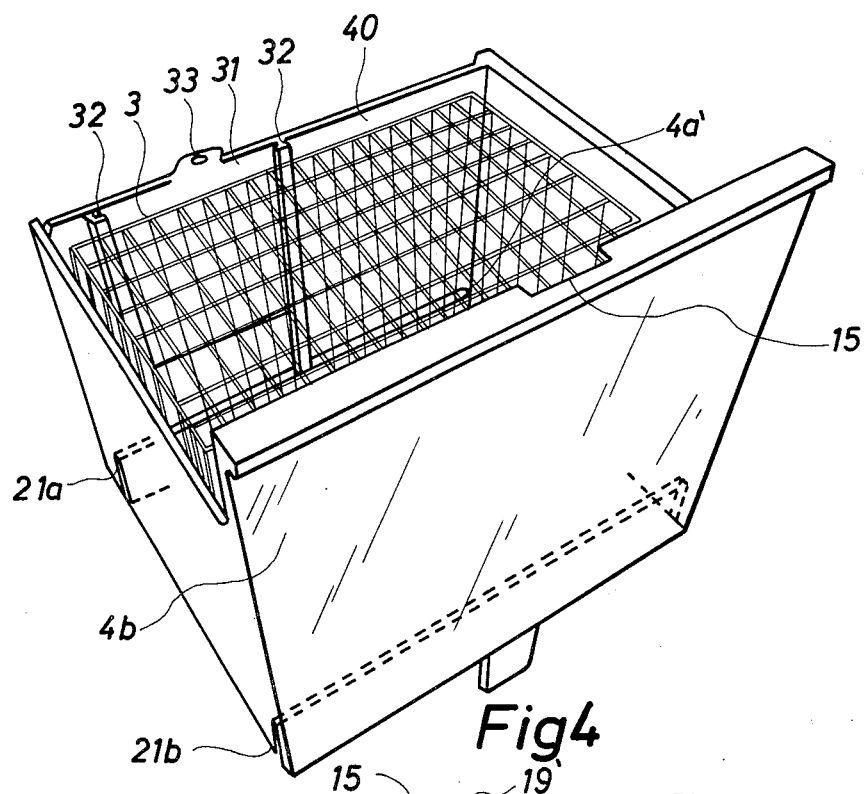
Figure 5:
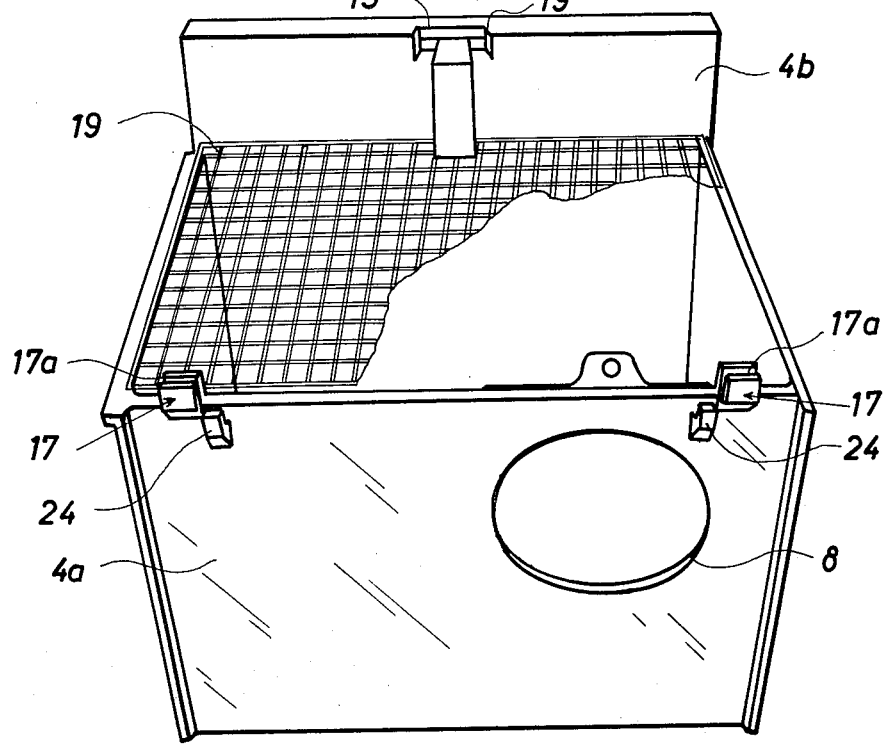
Figure 6:
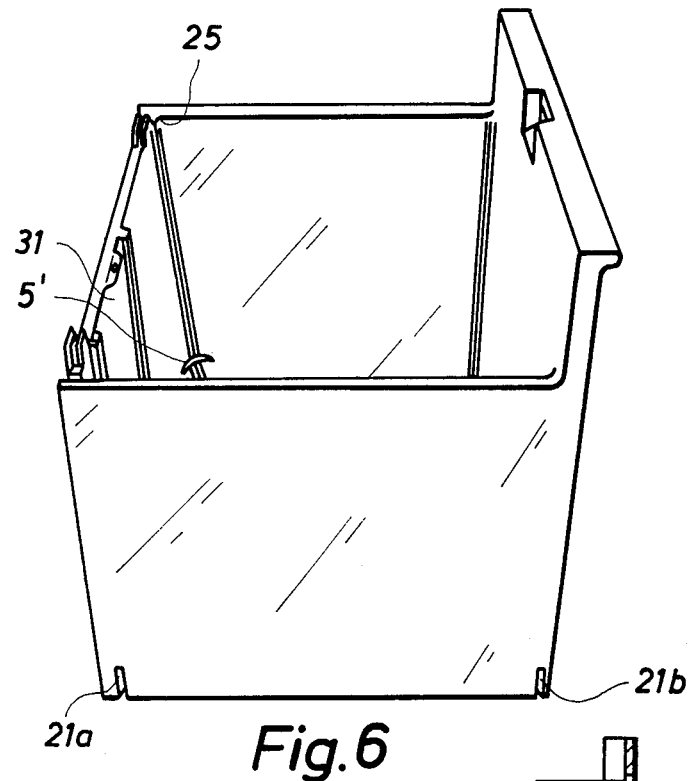
Figure 7:
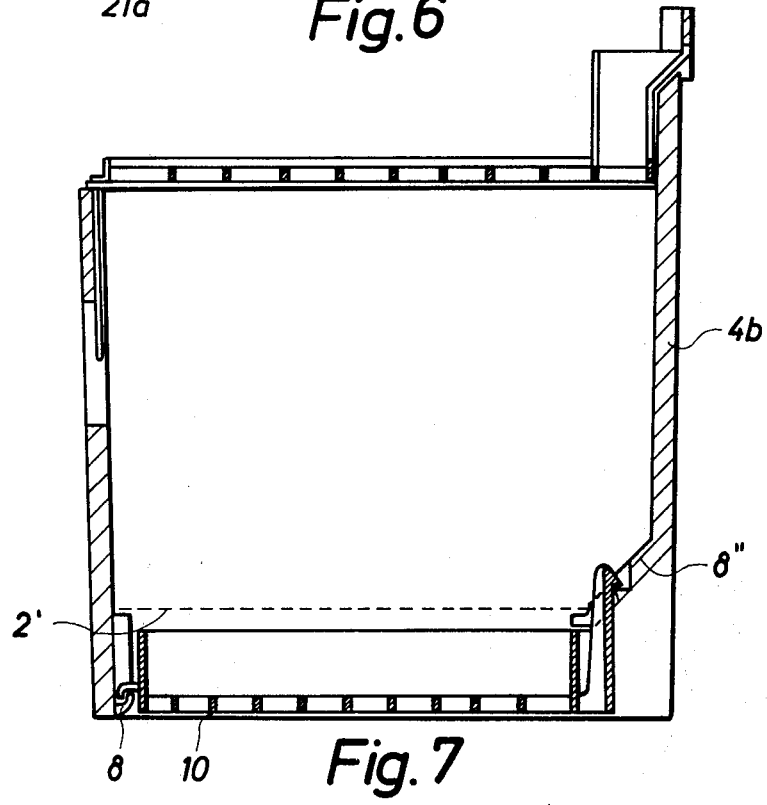
Figure 9:
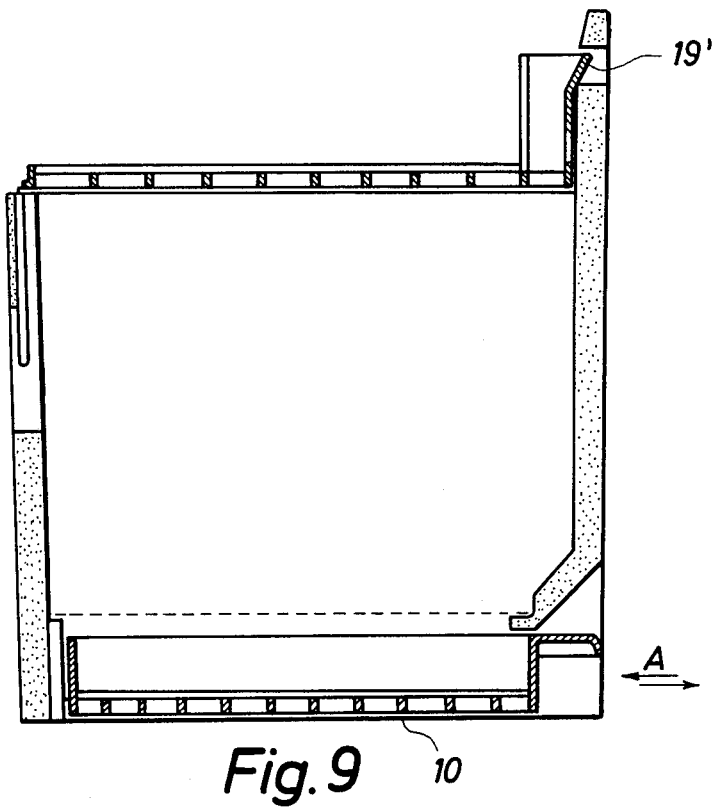
Figure 10:
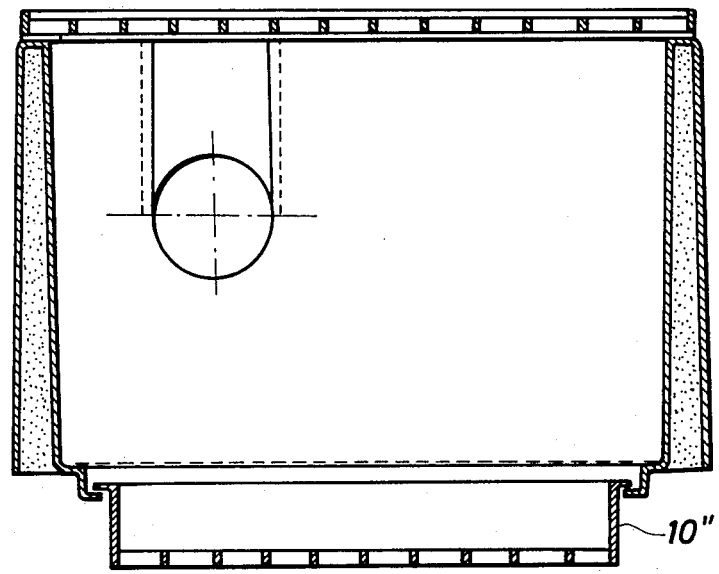

The invention will be described below with reference to the accompanying drawing, in which FIG. 1 is an oblique plan view of a breeding coop according to the invention, whereby the intermediate bottom clearly appears, FIG. 2 is a perspective view of a cage construction according to the invention, whereby a row of breeding coops appears to the left, FIG. 3 is a cross-sectional view through a wall of a breeding coop according to the invention, FIG. 4 is an oblique rear view of the breeding coop of FIG. 1, a coop insert, however, being inserted, FIG. 5 is an oblique front view of the breeding coop of FIG. 1, whereby an upper grate is provided, FIG. 6 is an oblique side view of the breeding coop of FIG. 5, whereby a corner ledge appears, FIG. 7 is a cross-sectional view through a second embodiment of a breeding coop according to the invention, whereby the hinging of the bottom wall to the wall of the coop clearly appears, FIG. 8 is a cross-sectional view of a projection for hinging a bottom wall, FIG. 9 is a cross-sectional view through a third embodiment of the breeding coop, whereby the bottom wall is shaped as a drawer capable of being pulled out, FIG. 10 is a longitudinal sectional view through a fourth embodiment of the breeding coop, whereby the drawer-shaped bottom wall projects below the lowermost edge of the pipe, FIG. 11 is a cross-sectional view through an alternative embodiment of the breeding coop, whereby hook-like protuberances are provided for supplementing the support of a cage, and FIG. 12 is a cross-sectional view of a projection at the uppermost edge of the breeding coop, said projection being a hinge.

The breeding coop illustrated in FIG. 1 is intended for forming part of the cage construction illustrated in FIG. 2. The cage construction comprises as shown a plurality of integrally formed cages 1 and a corresponding plurality of breeding coops 4. These cages and breeding coops rest on a stand 7. Each breeding coop comprises an opening 8, cf. FIG. 5, permitting access of the animals to the cage 1.

Each breeding coop is formed by a horizontal plastic pipe open at both ends and having a substantially rectangular cross section, which clearly appears from FIG. 1. The pipe wall is formed by a central foam plastic layer 14a, cf. FIG. 3, serving as a heat insulation, and of an outer and an inner solid surface layer 14b and 14c tightly connected to the foam plastic layer 14a thereby capsuling the latter completely. The surface layers 14b and 14c facilitate the cleaning of the breeding coop and assist in repelling impurities.

On the inner side of the pipe wall 4, cf. FIG. 1, molded projections 5 are provided projecting into said pipe and shaped at a predetermined distance from the lower edge 4' of the pipe wall. These projections 5 may serve two purposes, viz, they may either support a coop insert 3 arranged internally in the breeding coop, cf. FIG. 4, or they may support an intermediate bottom 2 in the form of a grate, preferably a metal grate. The grate 2 or the bottom of the coop cage forms the "floor" for the animals within the breeding coop.

One or more auxiliary projections 8, cf. FIG. 7, and 8', cf. FIG. 1, are provided at the lower edge 4' of the pipe wall on the front wall 4a or rear wall 4b. The auxiliary projection 8 assists in pivotable mounting of a perforated bottom wall 10 closing the breeding coop, said perforated bottom wall optionally being a metal grate. The auxiliary projection 8' assists in locking said bottom wall 10, which is, however, not illustrated in FIG. 1.

The rear wall 4b of the breeding coop 4 may as shown extend a short distance above the remaining portion of the pipe. The rear wall 4b comprises at the top molded means 15 in the form of a recess, cf. FIG. 4. This recess assists in locking of the coop insert in the pipe. The molded means 15 may optionally also be an aperture in the wall 4b or a projection facing the interior of the pipe.

If the breeding coop 4 instead of a coop insert comprises an intermediate bottom, cf. FIGS. 1 and 5, the upper end of the pipe wall may comprise hinge-forming projections 17, e.g. projections comprising an intergap 17a. These projections assist in pivotable mounting of a third grate 19 defining the top of the pipe. In this case the animals will stay between the intermediate bottom and the third grate 19. The grate 19 is in an appropriate manner secured to the rear wall 4b by providing a locking pipe on its surface, said locking pipe comprising a tongue 19' projecting into the recess 15, cf. in particular FIG. 9.

The stand supporting the cages and the breeding coops comprises two substantially hairpin-shaped main carrying rails 7', only one appearing from FIG. 2, which may be secured directly on one or more supporting posts 20 supporting the roof construction over the cage construction. Two longitudinal auxiliary rails 7a and 7b extend between the two main carrying rails, i.e. perpendicular thereto, and these auxiliary rails support the breeding coops 4. At the ends these auxiliary rails are provided with slots permitting an easy securing thereof on the main carrying rails. The main carrying rails are besides manufactured of flat bar bent as hairpins. The auxiliary rails may also be of flat bar or they may for instance have an L-cross section.

FIGS. 4 and 6 clearly illustrate how the breeding coop 4 at its lower edge 4' may comprise one or more recesses 21a and 21b optionally shaped in beads on the pipe wall. Such a bead appears at 4a' in FIG. 4. The recesses assist in receiving the auxiliary rails 7a and 7b and thereby assist in maintaining the individual breeding coops correctly relative to the cage 1.

FIGS. 5 and 10 illustrate particularly clearly that the front wall 4a of the breeding coop, i.e. the wall facing the cage 1, may be provided with hook-like protuberances 24 serving as an additional support of the cages 1 and at the same time keeping the individual cage and the associated breeding coop tightly together. In FIG. 5 the protuberances 24 are arranged at the top of the front wall 4a, whereas the protuberances illustrated in FIG. 10 are arranged at the bottom.

The plastic pipe forming the breeding coop is preferably made of structural plastics, the intermediate layer of the pipe comprising a foam agent, i.e. a propellant, for foaming said layer. The plastic may for instance be high density polyethylene having a great impact strength at low temperatures, and it must furthermore be able to withstand steam cleaning. The plastic used may, however, also be polypropylene. The plastic pipe may besides be manufactured by injection molding, a foaming agent being added to the plastic in the middle of the pipe wall. Thus a foam layer capsuled between two solid skin-like surface layers is provided, cf. FIG. 3.

FIGS. 4 and 5 illustrate how the opening 8 of the breeding coop to the cage may be closed by means of a vertical sliding door 31 extending in some guideways 32 and being provided with a grip portion 33 in such a manner that the fur farmer can easily regulate the access to the breeding coop. Instead of a sliding door, a swing door, i.e. a pivotable flap, may be provided.

In order to facilitate the cleaning, the inner corners of the breeding coop 4 may be slightly rounded, cf. FIG. 6 at 25.

The auxiliary projection 8 in FIG. 8 is illustrated on a larger scale than in FIG. 7. This auxiliary projection assists as mentioned above in pivotable mounting of the bottom wall 10. In order to lock the bottom wall on the wall of the breeding coop opposite the auxiliary projection 8, a recess 9 may be shaped in this wall. The recess 9 may, however, be arranged on a projection 8'' projecting into the plastic pipe from the rear wall 4b thereof. When the lower portion of the breeding coop is to be cleaned, the bottom wall 10 is released in such a manner that it swings about the projection 8, whereby straw and impurities collected on the bottom wall fall out of the breeding coop. Straw is usually located between the grate 2', i.e. the bottom of the coop insert, and the bottom wall 10, as well as on top of the top wall of the coop insert, said top wall being a grate.

FIG. 9 illustrates an embodiment of the breeding coop, whereby the bottom wall 10' is shaped as a drawer capable of being pulled out and sliding in some side bars. The drawer may be moved in a direction indicated by the two arrows A. The bottom wall is, however, located almost hidden by the pipe wall.

FIG. 10 illustrates a still further embodiment of the breeding coop, whereby the bottom wall 10'' is also shaped as a drawer located immediately under the lowermost edge of the platic pipe.

The cage construction and breeding coop according to the invention may be varied in many ways without deviating from the scope of protection. Thus the hinge-forming projections 17 on the uppermost edge of the plastic pipe may be some wall portions 17' and 17'', between which a flexible hinge portion 37, i.e. a living hinge, is embedded, cf. FIG. 12.

We claim:

1. A cage construction for use in breeding fur-bearing animals, such as mink, and comprising a plurality of cages arranged on a stand, whereby each cage is provided with a breeding coop with an opening giving access to the cage, characterized in that each breeding coop (4) comprises a vertical plastic pipe open at both ends and having a substantially rectangular cross section, said pipe wall being formed by a central foam plastic layer (14a) and an outer and an inner solid surface layer (14b and 14c), said layers being integrally connected, molded projections (5) projecting into the pipe on the inner side of the pipe wall at a predetermined distance from the lower edge (4') of the pipe wall, said projections optionally being present in the form of corner ledges (5') for supporting an inner coop insert (3) in the form of a grate, at least one set of auxiliary projections (8, 8', 8'') provided at the lower edge (4') of said pipe wall, said projections being adapted to pivotably mount perforated bottom wall (10) such as a second grate closing the plastic pipe, a part of said pipe wall forming the rear wall (4b) of the breeding coop (4) being extended a short distance above the remaining portion of the pipe and provided with molded means (15) opposing the interior of the pipe, for locking the coop insert (3) in the pipe.

2. A cage construction as claimed in claim 1, whereby the breeding coop comprises an intermediate bottom in the form of a metal grate instead of the coop insert, characterized in that the upper end of the pipe wall comprises hinge-forming projections (17, 17', 17'', 37) such as for instance projections with an intergap (17a, 17b) adapted for pivotably mounting a third grate (19) (FIGS. 5 and 12) defining the upper end of the pipe.

3. A cage construction as claimed in claim 2, characterized in that the cage stand (7) is formed by two substantially hairpin-shaped main carrying rails (7') for securing on one or more vertical supporting posts (20), as well as by at least two longitudinal auxiliary rails (7a, 7b) supporting the breeding coops (4), said auxiliary rails (7a, 7b) extending from one main carrying rail to the other.

4. A cage construction as claimed in claim 3, characterized in that the pipe wall at its lower edge (4') comprises one or more recesses (21a, 21b) co-operating with one or more of the longitudinal auxiliary rails (7a, 7b) in the coop stand in such a manner, that the breeding coops (4) may optionally be displaced along the auxiliary rails (7a, 7b).

5. A cage construction as claimed in claim 4, characterized in that the recess (21a, 21b) is made in a bead (4a') on the pipe wall (FIG. 4).

6. A cage construction as claimed in claim 5, characterized in that the pipe wall on the side (4a) opposing the cage comprises molded hook-like protuberances (24) supporting the cages (1).

7. A cage construction as claimed in claim 6, characterized in that the plastic pipe is made of structural foam, and that the central layer (14a) of the pipe comprises a propellant foaming said layer.

8. A cage construction as claimed in claim 7, characterized in that the plastic pipe is made of high density polyethylene having great impact strength at low temperatures and withstanding steam cleaning.

9. A cage construction as claimed in claim 7, characterized in that the plastic pipe is made of polypropylene.

10. A cage construction as claimed in claim 9, characterized in that the plastic pipe is manufactured by injection moulding using a foam agent, whereby the pipe comprises a foam layer (14a) capsuled between two solid skin-like surface layers (14b, 14c).

11. A cage construction as claimed in claim 10, characterized in that the opening (8) of the breeding coop (4) to the cage (1) is adapted to be closed by means of a sliding or a swing door (31).

12. A cage construction as claimed in claim 11, characterized in that the inner corners (25) of the pipe are slightly rounded (FIG. 6).

* * * * *